| United States Patent Office | 3,644,521 |
|---|---|
| | Patented Feb. 22, 1972 |

3,644,521
N-(ALPHA, ALPHA-DIMETHYLBENZYL)-ALPHA, ALPHA-(DIMETHYLALKYLAMIDES)
George A. Buntin, Wilmington, Del., assignor to Hercules Incorporated, Wilmington, Del.
No Drawing. Application July 1, 1968, Ser. No. 741,253, now Patent No. 3,498,781, which is a continuation-in-part of application Ser. No. 691,941, Dec. 20, 1967. Divided and this application Dec. 12, 1969, Ser. No. 889,812
Int. Cl. C07c *103/34*
U.S. Cl. 260—562 R    2 Claims

ABSTRACT OF THE DISCLOSURE

Disclosed are the compounds N-(alpha,alpha-dimethylbenzyl) - 2,2 - dimethylpropionamide, N-(alpha,alpha-dimethylbenzyl) - 2,2 - dimethylbutyramide and N-(alpha, alpha-dimethylbenzyl) - 2,2 - dimethylvaleramide, and a general reaction by which they are made. The compounds have utility as herbicides.

---

The application is a division of the application, Ser. No. 741,253, filed July 1, 1968, for N-(Alpha,Alpha-Dimethyl Benzyl) Alpha,Alpha-(Dimethyl Alkylamides) and Use as Selective Herbicides, now U.S. Pat. 3,498,781, which Ser. No. 741,253 application is a continuation-in-part of the then copending application Ser. No. 691,941, filed Dec. 20, 1967, and now abandoned.

This invention relates to compounds having selective pre-emergence herbicidal activity and to the control of weeds in crops by the treatment of the locus of said weeds therewith.

In accordance with this invention, it has now been found that compounds of the formula

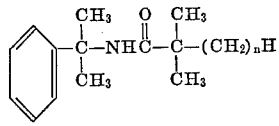

where $n=1$, 2, or 3 have excellent pre-emergence herbicidal activity when applied in low concentration to soil which normally supports the growth of seedlings.

The three compounds which fall within the scope of this formula are N-($\alpha,\alpha$-dimethylbenzyl) - 2,2 - dimethylpropionamide, N-($\alpha,\alpha$-dimethylbenzyl)2,2 - dimethylbutyramide, N-($\alpha,\alpha$-dimethylbenzyl)2,2-dimethylvaleramide and are referred to hereinafter as compounds A, B and C respectively. The plants which require the highest rate of application in pounds per acre (lbs./acre) for complete kill are the more tolerant. Selectivity in spraying is practiced by using just the amount required to accomplish the desired objective.

These compounds are well tolerated by tomatoes and lima beans and are suitable for spraying the locus of such crops for pre-emergence control of woods. The lowest molecular weight compound of this group, wherein $n=1$, is N-($\alpha,\alpha$-dimethylbenzyl) - 2,2 - dimethylpropionamide. This compound when sprayed as a dilute aqueous emulsion of a wettable powder on clay with a logarithmic sprayer on a seeded plot was shown to have selective control. The data are set forth in Table 1. These data show the least amount of herbicide required to kill completely the various plants at the germination stage and thus prevent their growing, as compared to a similarly seeded plot which was not sprayed. The spraying process provides a logarithmic change in rate per acre of the herbicide sprayed on the plot.

TABLE 1

N-($\alpha,\alpha$-dimethylbenzyl)2,2 - dimethylpropionamide as a pre-emergence herbicide using logarithmic spreading (rate of application required for 100% kill of the plants)

| Species: | Lbs./acre |
|---|---|
| Sudan grass | 7.6 |
| Millet | 5.8 |
| Flax | 2.6 |
| Sugarbeet | 3.5 |
| Alfalfa | >12.0 |
| Grain sorghum | 8.2 |
| Oats | 1.3 |
| Mustard | 7.1 |
| Tomato | >12.0 |
| Carrots | 1.1 |
| Sunflower | 10.7 |
| Cotton | 10.7 |
| Peas | 1.3 |
| Lima beans | >12.0 |
| Grass | 3.0 |
| Purslane | 1.4 |
| Pigweed | 1.3 |
| Spurge | 4.3 |

The general procedure for carrying out the tests in the greenhouse is one in which the test compounds are applied to 6 to 20 species of plants. In the general procedure, the test compound is made into a concentrate using an organic solvent where, as here, the compound is not water soluble, and a monosorbitan polyoxyethylene compound (Tween 20) as an organic surface active agent. This concentrate is then converted into an emulsion by pouring with stirring into water, and the resulting emulsion is sprayed on the seeded boxes of soil. The seeded boxes are sprayed uniformly under a spray covering a known area with an amount of emulsion sufficient to give a coverage at a rate of 1 to 10 pounds per acre, the amount used depending on activity. The amount of plant injury is observed after a two-week period and graded from no injury to complete kill.

The general procedure for carrying out field tests with logarithmic spraying of Table 1 is described by Pfeiffer et al., Nature 176, pp 472–3 (1955) and Day, Weeds 6, pp. 441–6 (1958).

The compounds of this invention are made herbicidally effective by applying them to the soil at the locus at which the desired and undesired plants normally grow. The compounds are applied to the soil as formulations of the compound and a herbicide carrier. The formulations are compositions which are dispersible in low concentrations as an aqueous emulsion, as a wettable powder, as granules of solid particles having the compound adsorbed thereto or as dust.

The formulations of low concentration are generally prepared from concentrates of the compound in an organic solvent when the compound is applied to the surface of granular solids for the production of a granular composition or from concentrates of the compound, and a surface active agent when the compound is to be dispersed in water as an aqueous emulsion.

The granular solids are made by adsorbing the compound on the surface of a solid granular herbicide carrier such as clay granules, sand, vermiculite, ground plant parts such as ground corn cobs, granular wood chips, sawdust, granular carbon, granular urea-formaldehyde resins and similar water insoluble granular materials. The particle size of granular particles for this use is generally in the range of 0.5 to 2 mm.

The advantage of granular materials lies in the fact that they can be applied to the soil in which leafy plants are growing without their adhering to such plants. A further advantage lies in their low drift properties which can be varied by selection of granules of high density. A still further advantage of granular compositions lies in their ability to retain the active agent near the soil surface by slow release of the active compound therefrom even under heavy rainfall conditions.

The granular compositions are usually formulated with 2 to 10 parts active compound adsorbed on 90 to 98 parts granular solid.

The compounds of this invention are made into dispersible concentrates by mixing the herbicidal compound with a surface active agent as a dispersing agent therefor, and the concentrate is readily dilluted with a solid carrier such as clay to form a dusting powder or with water to form an aqueous emulsion. The surface active dispersing agents which may be used are organic or inorganic dispersing agents or a mixture thereof.

The solid surface active dispersing agents include fuller's earth, china clay, kaolin, attapulgite, bentonite, and related natural and synthetic aluminum silicates having the property of forming a colloidal gel.

The organic surface active dispersing agents particularly useful for forming aqueous compositions are neutral soaps of resin acids, alginic acids, and fatty acids and ammonia, alkyl amines or alkali metals, saponins, gelatins, milk, soluble casein, vegetable proteins, sulfite lye, lignin pitch, sulfite liquor, long-chain (12 to 18 carbon) fatty alcohols and alkali metal salts of the sulfated fatty alcohols, salts of sulfinic acids, esters of long-chain fatty acids and polyhydric alcohols in which the alcohol groups are free, omega-substituted polyethylene glycols of relatively long-chain length, particularly those in which the omega substituent is aryl, alkyl or acyl. The organic surface active agents may be used alone or as mixtures, or in addition to an inorganic solid dispersing agent or, when used as the sole surface active agent, an organic solvent may also be used therewith to improve liquidity and non-crystallinity of the composition.

The dispersible concentrate will contain 10 to 80% active herbicidal compound and 20 to 90% dispersing agent. A solid dispersible concentrate will contain either all solid inorganic surface active substances such as those listed above, or 1 to 10% organic surface active agent and the solid inorganic surface active agent in the complementary amount and preferably in the range of 20 to 50% of the composition. A liquid dispersible concentrate will usually contain 10 to 50% active herbicidal compound and 50 to 90% organic dispersing agent in which 1 to 10% is organic surface active agent, and the rest is organic solvent diluent in an amount sufficient to aid in the liquidity of the concentrate.

A solid dispersible concentrate containing organic surface active agent is known as a wettable powder. It may be diluted with more clay, or it may be dispersed in water to form an aqueous emulsion at the time of use. The liquid dispersible concentrate can be diluted with more organic solvent but is preferably diluted with water so as to form an aqueous emulsion. These diluted compositions usually contain 0.1 to 5% active compound in the concentration at which they are applied at the time of use.

The compositions are applied to the soil which may contain desirable growing plants in their early stages of growth when they are unaffected by the herbicide, and the herbicide is used in a sufficient amount to act selectively on the undesired plants on germination thereof so as to allow the desired plants to survive. The rate of application of the compounds will be in the range of 1 to 10 pounds per acre, depending on the results to be attained. In some cases, it may be desirable to make a second application before the weeds to be killed have reached the first true leaf stage.

The compounds of the present invention are made by the following general reaction:

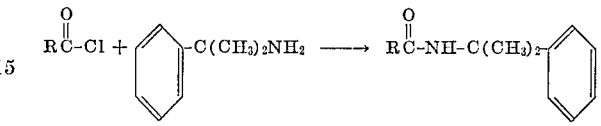

in which

is the acid chloride of 2,2-dimethylbutyric acid, 2,2-dimethylpropionic acid or 2,2-dimethylvaleric acid following known general procedures.

Following this general procedure, each of the compounds of this invention was prepared and found to be crystalline solids having the following melting points:

(A) N-($\alpha,\alpha$-dimethylbenzyl)2,2-dimethylpropionamide, M.P. 105–6° C.
(B) N-($\alpha,\alpha$-dimethylbenzyl)2,2-dimethylbutyramide, M.P. 92–4° C.
(C) N-($\alpha,\alpha$-dimethylbenzyl)2,2-dimethylvaleramide, M.P. 99–101° C.

A concentrate was made from each of these compounds by dissolving 15 grams of each in 400 ml. acetone and then adding 20 ml. Tween 20. These concentrates were then diluted with sufficient water to produce 1-liter of emulsion of 1.5% concentration.

For soil germination tests, potting soil of a mixed composition of 50% silt loam top soil and 25% each of used mushroom soil and sand was used. This soil was mixed with the fungicide captan (N-trichloromethylmercapto-4-cyclohexane-1,2-dicarboxamide) at a rate of 0.14 gram per liter of soil. Boxes of ½ liter capacity and having a top area of 100 sq. cm. were charged with the treated soil, and seeds of various species of plants were planted, using one box per species. The number of seeds and depth of planting varied with the species, the large seeds being 10 per box planted 1 cm. deep, and the small being up to 100 per box planted 0.5 cm. deep. The soil was dampened during planting and sprinkled with 1.5% herbicide emulsion at a rate of 2 lbs./acre of top surface, a complete set of boxes being treated at one time. The boxes were held at 70° F. in a greenhouse for 2½ to 3 weeks with daily watering, the first being by sprinkling and the subsequent watering being by sub-irrigation using watering pans to hold the boxes. The count of growing seedlings was made at the end of 3 weeks and compared with the blank. The percent reduction in growth of the species was estimated, and the following rating values were used:

| Percent reduction: | Rating |
|---|---|
| 0 | 0 |
| 1–10 | 1 |
| 11–20 | 2 |
| 21–30 | 3 |
| 31–40 | 4 |
| 41–50 | 5 |
| 51–60 | 6 |
| 61–70 | 7 |
| 71–80 | 8 |
| 81–90 | 9 |
| 91–100 | 10 |

The results are recorded in Table II.

TABLE II

| Plant species | Rating A | Rating B | Rating C |
|---|---|---|---|
| Millet ((Setaria) | 5 | 7 | 0 |
| Tomato (Lycopersicon) | 0 | 0 | 0 |
| Sorghum (Sorghum) | 4 | 0 | 9 |
| Buckwheat (Fagopyrum esculentum) | 5 | 3 | 0 |
| Buckwheat (Avena fatua) | 0 | 1 | 0 |
| Cotton (Gossypium hisutum) | 0 | 0 | 0 |
| Downybrome (Bromus tectorum) | 6 | 6 | 0 |
| Lima bean | 0 | 0 | 0 |
| Sudan grass (Sorghum vulgare sudanensis) | 0 | 0 | 0 |
| Alfalfa (Medicago sativa) | 0 | 0 | 0 |
| Barley (Hordeum vulgare) | 2 | 3 | 4 |
| Snapbean | 0 | 0 | 0 |
| Soybean (Soja max) | 0 | 0 | 0 |
| Carrot (Daucus carota) | 0 | 0 | 0 |
| Corn (Zea mays) | 0 | 0 | 0 |
| Cucumber (Cucumis sativus) | 0 | 0 | 5 |
| Sugar beet (Beta saccharifera) | 0 | 1 | 3 |
| Kochia | 6 | 2 | 4 |
| Wild mustard (Brassica juncea) | 0 | 0 | 0 |

Compound A of this invention is the most persistent of the three compounds of this invention and is the preferred compound.

The herbicides of this invention are useful for controlling weeds in fields of tomatoes, lima beans, sunflower, cotton and alfalfa. They are particularly useful in controlling weeds in fields of direct seeded tomatoes.

All parts and percentages as used herein are by weight.

What I claim and desire to protect by Letters Patent is:

1. N - (alpha,alpha - dimethylbenzyl) - 2,2 - dimethylbutyramide.

2. N - (alpha,alpha - dimethylbenzyl) - 2,2 - dimethylvaleramide.

References Cited

OTHER REFERENCES

Cram et al., J. Am. Chem. Soc., vol. 74, p. 5851–59.

HENRY R. JILES, Primary Examiner

H. I. MOATZ, Assistant Examiner

U.S. Cl. X.R.

71—118

PO-1050
(5/69)

UNITED STATES PATENT OFFICE
CERTIFICATE OF CORRECTION

Patent No. 3,644,521      Dated February 22, 1972

Inventor(s) George A. Buntin

It is certified that error appears in the above-identified patent and that said Letters Patent are hereby corrected as shown below:

Column 1, line 59; "woods" should read --weeds--

Column 5, Table II, line 5 under Heading of
"Plant species";
"Buckwheat (Avena fatua" should read
--Wild Oats (Rvena fatua)--

Column 5, Table II, line 3 under Heading "Rating",
column C; "9" should read --0--

Signed and sealed this 27th day of June 1972.

(SEAL)
Attest:

EDWARD M. FLETCHER, JR.      ROBERT GOTTSCHALK
Attesting Officer      Commissioner of Patents